Aug. 10, 1965

J. T. CARROLL 3,200,258

TIME DELAY STATIC SWITCH WITH IMPEDANCE MATCHING AND RAPID RESET MEANS

Filed June 15, 1961

Inventor
John T. Carroll
By W Robertson
Attorney

United States Patent Office 3,200,258
Patented Aug. 10, 1965

3,200,258

TIME DELAY STATIC SWITCH WITH IMPEDANCE MATCHING AND RAPID RESET MEANS

John T. Carroll, West Allis, Wis., assignor to Allis-Chalmers Manufacturing Company, Milwaukee, Wis.

Filed June 15, 1961, Ser. No. 117,361
1 Claim. (Cl. 307—88.5)

Figure 1:
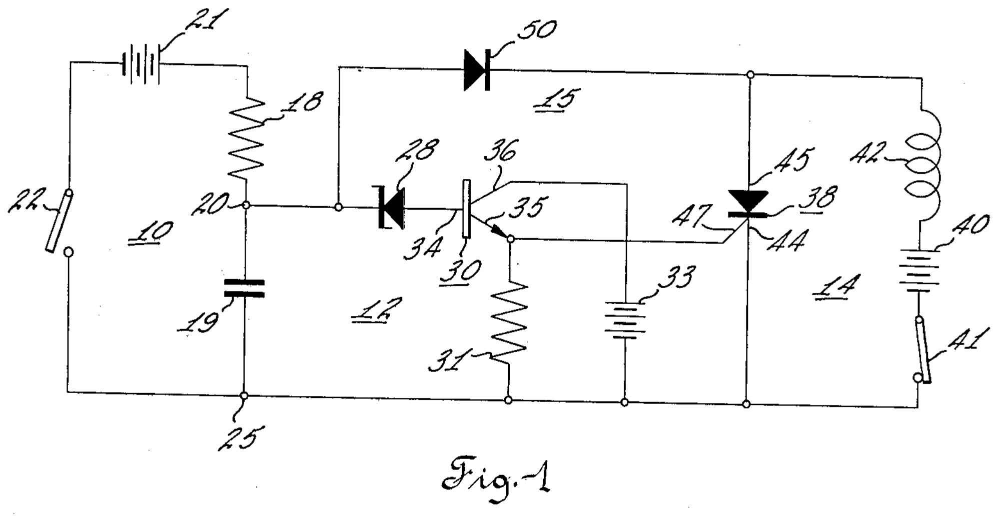

This invention relates generally to a time delay static switch. More specifically, this invention relates to an improved time delay static switch that switches a controlled rectifier.

The resistance-capacitance (RC) circuit is the basis of many well known time delay devices. When a voltage called the charging voltage is applied to a resistor and a capacitor in series, the voltage across the capacitor logarithmically approaches the charging voltage. Circuits associated with the RC circuit respond when the capacitor has charged to the charging voltage or to a selected intermediate voltage at the end of the timing period. The voltage that signals the end of a timing period will be called the timing voltage. The associated circuits then discharge the capacitor to a low reset voltage to prepare for the next timing period.

The values of the resistance, the capacitance, the charging voltage, and the timing voltage establish the timing period; and any of these values might be varied to provide a selected timing period. However, in a practical timing circuit the physical and electrical characteristics of resistors and capacitors and of the associated circuits limit the values that might be chosen. The timing voltage and the charging voltage are closely limited by the associated circuits. High value capacitors are bulkier, are more expensive, and are more fragile than low value capacitors. In an RC circuit with a long timing period, these characteristics lead to a high impedance (high resistance, low capacitance) circuit. Although from the standpoint of the timer alone, a high impedance is desirable, the high impedance presents problems in the associated circuits that respond to the timing circuit.

In many static timers the timing capacitor is connected to the responding circuit through a voltage breakdown device such as a zener diode or a neon bulb. A zener diode, for example, conducts in its reverse direction at a reliably predictable voltage and thereby very accurately establishes the timing voltage. A zener diode, and other voltage breakdown devices as well further increases the output impedance of the timing circuit.

The high impedance characteristics that are desirable in an RC time delay are well suited to voltage operated devices, and high impedance RC circuits are widely used with vacuum tube circuits. However, some semiconductor devices such as the controlled rectifier require an appreciable control current. A timing circuit should present a low impedance output to such a device in order to supply this current.

In the time delay switch of this invention, a transistor is connected in a circuit configuration that produces a high impedance input and a low impedance output. The transistor couples the high impedance timing circuit to the low impedance gate circuit of a controlled rectifier. The high impedance input of the transistor corresponds to the high impedance of an RC circuit with a long timing period. The low impedance output of the transistor corresponds to the low impedance gate circuit of a controlled rectifier.

The time delay switch of this invention also has an improved reset circuit for the RC timer. The reset circuit discharges the timing capacitor at the end of each timing period and prepares the timing circuit for the next timing period. In some well known timing circuits the capacitor simply discharges through the associated circuits. However, a voltage breakdown device such as a zener diode or a neon bulb that is connected between the capacitor and the associated circuits may limit or altogether prevent the capacitor from discharging in this way. The time delay switch of this invention includes a reset diode circuit that in its forward direction connects the capacitor across the controlled rectifier and discharges the capacitor through the controlled rectifier when the controlled rectifier conducts at the end of a timing period. In the reverse direction the diode isolates the timing capacitor from voltage sources that are associated with the controlled rectifier circuit.

One object of this invention is to provide a new and improved time delay static switch.

Another object of this invention is to provide a time delay circuit for a controlled rectifier switch.

Another object of this invention is to provide a time delay switch that has a high impedance timing circuit and a low impedance switch gating circuit.

Another object of this invention is to provide a static time delay switch with an improved reset circuit.

FIG. 1 in the drawing showns the circuit in a simplified form that illustrates some of the general concepts of the invention.

Figure 2:
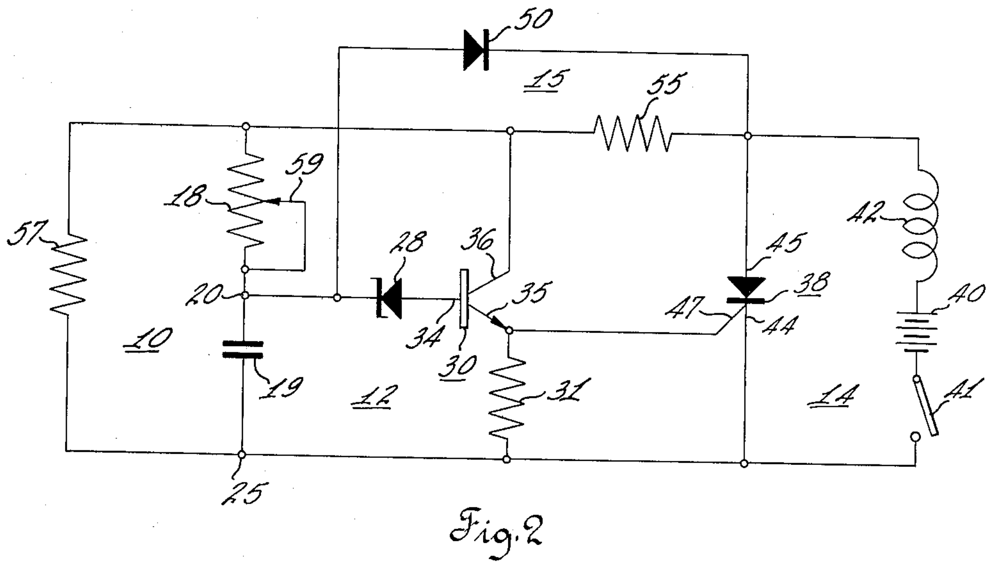

FIG. 2 is a more detailed embodiment of the invention.

The time delay switch of FIG. 1 comprises a timing stage 10, a coupling stage 12, a switching stage 14, and a reset 15. The timing stage 10 comprises a timing resistor 18 and a timing capacitor 19 that are connected in series at a terminal 20, a source 21 that supplies a charging voltage, and a switch 22 for connecting the source 21 to the resistor 18 and the capacitor 19 to start a timing period. The schematic resistor 18 represents a physical resistor and the other resistances in the circuit such as the resistance of the source 21. All of the resistances that are coupled to the capacitor influence the timing period. The terminal 20 of the capacitor 19 forms one output terminal of the timing stage of the switch. The other terminal 25 of the capacitor 19 forms another output terminal of the timing stage 10 and a common potential point for all these stages.

The coupling stage 12 comprises a zener diode 28, an NPN type transistor 30, a coupling resistor 31, and a source 33 of collector current. The transistor 30 has a base electrode 34, an emitter electrode 35, and a collector electrode 36. The circuit has an NPN type transistor because the polarity characteristics of an NPN type transistor are compatible with the polarity characteristics of present day controlled rectifiers. The three electrodes 34, 35, 36 of the transistor are connected to other elements of the circuit to form a common collector, emitter follower configuration. The emitter 35 is common to both the input circuit and the output circuit of the coupling stage 12.

The input circuit of the coupling stage 12 comprises, in series, the zener diode 28, the base and emitter electrodes 34, 35 of the transistor 30, and the coupling resistor 31. The cathode of the zener diode connects one end of the input circuit to the output terminal 20 of the timing stage 10, and one end of the coupling resistor 31 connects the input circuit to the common terminal 25. A current in the clockwise direction in the input circuit forward biases the base emitter junction of the transistor 30 and permits a corresponding collector current to flow in the output circuit of the coupling stage 12.

The zener diode 28 is polarized against current flow in the clockwise or forward biasing direction of the input circuit of the coupling stage. Until the voltage across the zener diode reaches the breakdown voltage, the zener diode blocks current in the forward biasing direction.

While the capacitor 19 charges, the zener diode 28 does not conduct, and the voltage across the capacitor appears across the zener diode. The breakdown voltage of the zener diode defines the timing voltage that signals the end of a timing period. When the capacitor 19 charges to the timing voltage, the zener diode 28 conducts in its reverse direction and connects the base 34 of the transistor 30 to the output terminal 20 of the timing stage 10.

Preferably, the timing circuit has a high impedance to provide a long time delay. The zener diode 28 further increases the impedance of the circuit to which the base and emitter 34, 35 of the transistor 30 are connected. Even when the zener diode 28 conducts, the capacitor 19 cannot discharge through the base 34 and emitter 35 of the transistor 30 since the capacitor must remain charged to the zener breakdown voltage to maintain the zener diode conducting. The bias current for the transistor 30 is provided only by the timing voltage source 21 which is in circuit with the high resistance resistor 18. Transistors that require only a small biasing current are suitable for this circuit. The small bias current corresponds to the high resistance of the timing resistor 18.

The coupling resistance 31 has been neglected so far in this discussion of the input circuit because it is small relative to the timing resistance 18. In addition to coupling the collector current to the switching stage, the coupling resistance 31 couples part of the collector current to the base emitter circuit. The discussion will also neglect the effect of collector current on the input circuit because the effect is small in terms of the current that is available for biasing the transistor and gating the controlled rectifier.

The switching stage 14 comprises a controlled rectifier 38, a power source 40, a load switch 41 and a load 42 that is shown as the coil of a relay. The controlled rectifier 38 has a cathode 44, an anode 45 and a gate electrode 47. The cathode 44 and the gate 47 form the input to the switching stage. The cathode 44 is connected to the common potential point 25, and the gate 47 is connected between the emitter 35 and the coupling resistor 31 of the coupling stage 12. When collector current flows in the transistor 30, the resistor 31 couples part of this current to the input of the switching stage 14 and gates the controlled rectifier 38.

The controlled rectifier 38 does not conduct in its reverse direction, and until it is gated, it does not conduct in its forward direction. When a gating current flows in the input, the controlled rectifier conducts in its forward direction, and it remains conducting without regard to the gating current so long as the anode is maintained slightly positive with respect to the cathode. Until a timing cycle is completed, the controlled rectifier 38 controls the switching circuit 14. In this condition, opening or closing the load switch 41 has no effect on the circuit. When the controlled rectifier conducts at the end of a timing period, the load 42 is energized, and the timing circuit and the controlled rectifier 38 lose control of the source. When the load switch 41 is opened, the switching circuit is interrupted and the controlled rectifier 38 returns to its nonconducting state.

The reset 15 comprises a diode 50 that connects the output terminal 20 of the capacitor 19 to the anode 45 of the controlled rectifier 38. Ordinarily the voltage of the power source 40 is somewhat higher than the voltage of the timing source 21. At the beginning of a timing period, the anode of the diode 50 is at the relatively low positive voltage of terminal 20 of the capacitor 19, and the cathode of the diode 50 is at the relatively high positive voltage of the power source 40. Since the cathode of the diode is more positive than the anode, the diode 50 cannot conduct. Thus, the diode 50 isolates the timing stage 10 from the voltage sources that are associated with the other stages. When the controlled rectifier 38 conducts, the polarity of the voltage across the diode 50 reverses, and the diode conducts. Most commercial controlled rectifiers conduct with only a few volts between the anode terminal and the cathode terminal. When the controlled rectifier 38 conducts at the end of a timing period, the voltage at the anode 45 of the controlled rectifier and at the cathode of the reset diode 50 changes from the high positive voltage of the source 40 to a very low positive voltage. The voltage of the capacitor 19 which appears at the anode of the diode 50 is positive with respect to the voltage at the cathode of the diode 50. The diode 50 conducts and discharges the capacitor 19 to the low voltage of the controlled rectifier 38.

Between timing periods the capacitor is very nearly discharged. When the timing switch 22 closes to begin a timing cycle, current flows in the timing stage 10 and charges the capacitor 19. During the timing cycle the high positive voltage of the source 40 cuts off the diode 50. The zener diode 28 is likewise cut off by the positive voltage at the terminal 20. Thus, both the coupling stage 12 and the switching stage 14 are isolated from the timing stage 10. The capacitor 19 charges logarithmically until the voltage at the terminal 20 reaches the breakdown voltage of the zener diode 28 (the timing voltage). When the capacitor charges to the timing voltage, the zener diode 28 conducts and a relatively small current flows from the charging voltage source 21 across the base emitter junction 34, 35, of the transistors 30. The base emitter current causes a current to flow in the emitter collector circuit of the transistor 30 and in the coupling resistor 31 and the gate circuit of the controlled rectifier 38. The gate current causes the controlled rectifier 38 to conduct in its forward direction, and load current flows in the load 42 from the power source 40. The capacitor 19 discharges to a low voltage through the diode 50 and the controlled rectifier 38. When the voltage at the terminal 20 drops below the timing voltage, the zener diode 28 becomes nonconductive and isolates the coupling stage 12 from the timing stage 10.

The circuit of FIG. 2 is similar in its general outlines to the circuit of FIG. 1 that has been just described. Both circuits have the same numbers in the drawing for related components. The circuit of FIG. 2 is significantly simplified and improved over the circuit of FIG. 1.

The circuit of FIG. 2 has a single power supply 40 that energizes the load 42 and also supplies the charging voltage and the collector current for the transistor 30. A voltage divider comprising two series connected resistors 55, 57 is connected across the cathode 44 and anode 45 of the controlled rectifier 38 to provide a suitable lower voltage for the timing stage and the coupling stage. The timing resistor 18 and capacitor 19 are connected across the voltage dividing resistor 57.

When the switch 41 is closed to start a timing cycle, the high voltage of the source 40 appears across the cathode and anode of the controlled rectifier and across the voltage dividing resistors 55, 57. This voltage is available throughout the timing period.

The timing resistor 18 has a variable top 59 that can be adjusted to provide the resistance that corresponds to the desired timing period. Decreasing the resistance 18 shortens the timing period.

When the controlled rectifier 38 conducts, the voltage across the controlled rectifier and across the two voltage dividing resistors 55, 57 falls to a very small voltage, and the timing stage 10 and the coupling stage 12 are in effect deenergized.

Those skilled in the art will recognize numerous variations in the details of the static timer that may be made within the scope of the claim.

Having now particularly described and ascertained the nature of my said invention and the manner in which it is to be performed, I declare that what I claim is:

A time delay relay for closing a circuit a selected period after a source of power is connected in the circuit, comprising, a semiconductor controlled rectifier having a cathode terminal, an anode terminal, and a gate terminal, means for connecting said cathode and anode terminals in the circuit to provide a potential across said cathode and said anode terminals, a capacitor and a resistor connected to form a timing circuit responsive to the potential across said cathode and anode terminals, a transistor having base, emitter and collector terminals; said collector terminal being connected to a source of current, a resistor connected in circuit with said emitter terminal and coupled to said gate and cathode terminals to turn on said controlled rectifier when said transistor turns on; means including a voltage breakdown device connecting said emitter and base terminals across said capacitor to turn on said transistor at a preselected capacitor voltage; and means including a diode connecting said capacitor across said anode and cathode terminals to discharge said capacitor when said controlled rectifier conducts.

References Cited by the Examiner

UNITED STATES PATENTS

| | | | |
|---|---|---|---|
| 2,867,754 | 1/59 | O'Bleness | 317—142 |
| 2,984,753 | 5/61 | Della Salle | 307—88.5 |
| 3,017,543 | 1/62 | Hillman et al. | 317—148.5 |
| 3,040,237 | 6/62 | Jones | 307—88.5 |
| 3,045,150 | 7/62 | Mann | 307—88.5 |

OTHER REFERENCES

Notes on the Application of the Silicon Controlled Rectifier, December 1958, pages 54 to 56.

W. Gutzwiller: "Phase-Controlling Kilowatts With Semiconductor," Control Engineering, May 1959.

Solid State Prod. Inc., Bulletin D420–02, August 1959, entitled: "A survey of some circuit applications of the silicon controlled switch and silicon controlled rectifier."

"Transistor Circuit Handbook," by Garner, published by Educational Book Div. Coyne Electrical School, Chicago 12, Ill., page 54, May 1958.

ARTHUR GAUSS, *Primary Examiner.*

HERMAN K. SAALBACH, GEORGE N. WESTBY, *Examiners.*